G. E. WHITNEY.
ASPHALT PRESS.
APPLICATION FILED OCT. 30, 1906.

1,007,831.

Patented Nov. 7, 1911.
8 SHEETS—SHEET 1.

WITNESSES:
Adolph C. Kaiser
Irving U. Townsend

INVENTOR
George E. Whitney
By
Emery and Booth
ATTORNEYS

G. E. WHITNEY.
ASPHALT PRESS.
APPLICATION FILED OCT. 30, 1906.

1,007,831.

Patented Nov. 7, 1911.
8 SHEETS—SHEET 3.

WITNESSES:

INVENTOR
George E Whitney
BY
Emery and Booth
ATTORNEYS

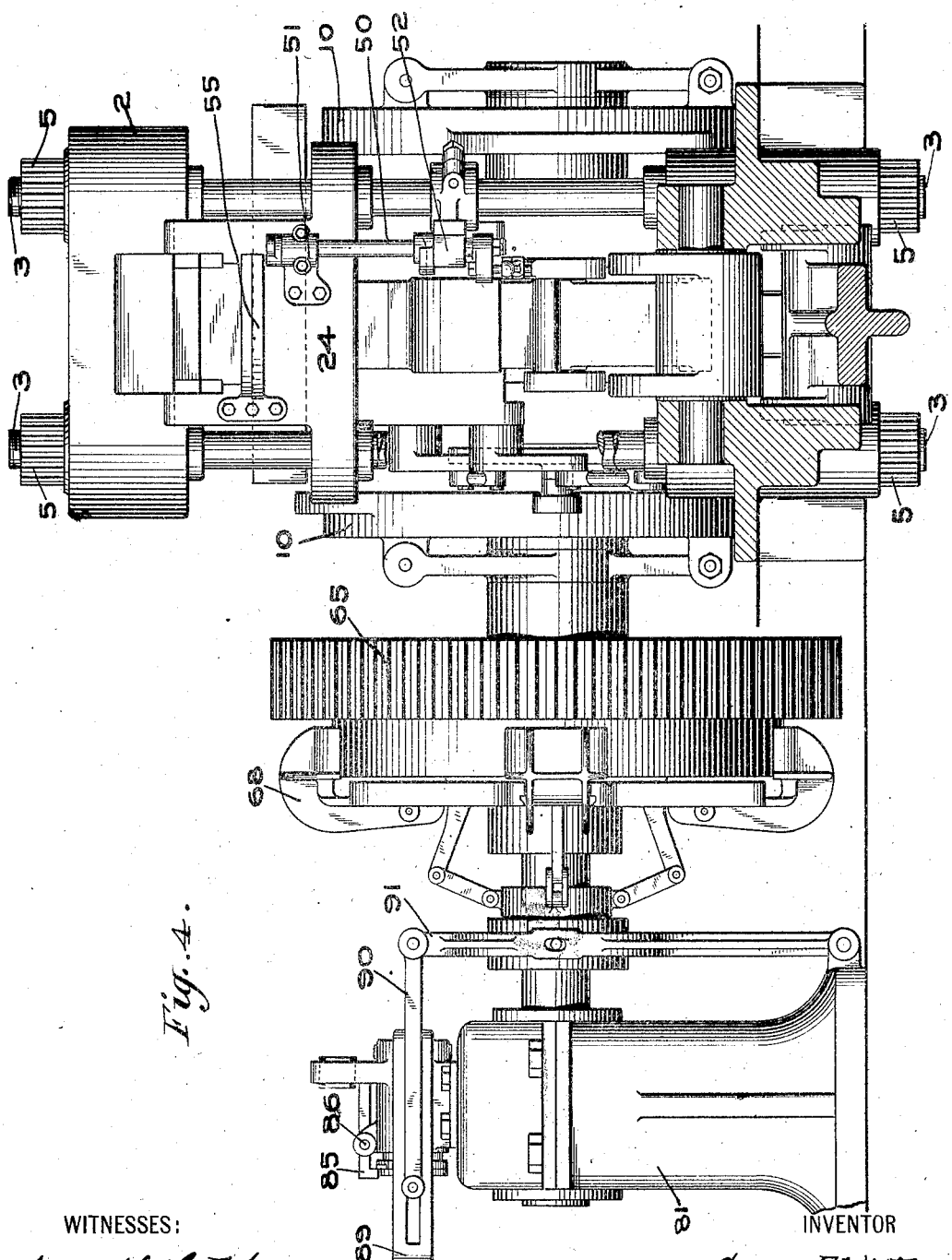

G. E. WHITNEY.
ASPHALT PRESS.
APPLICATION FILED OCT. 30, 1906.
1,007,831.
Patented Nov. 7, 1911.
8 SHEETS—SHEET 5.
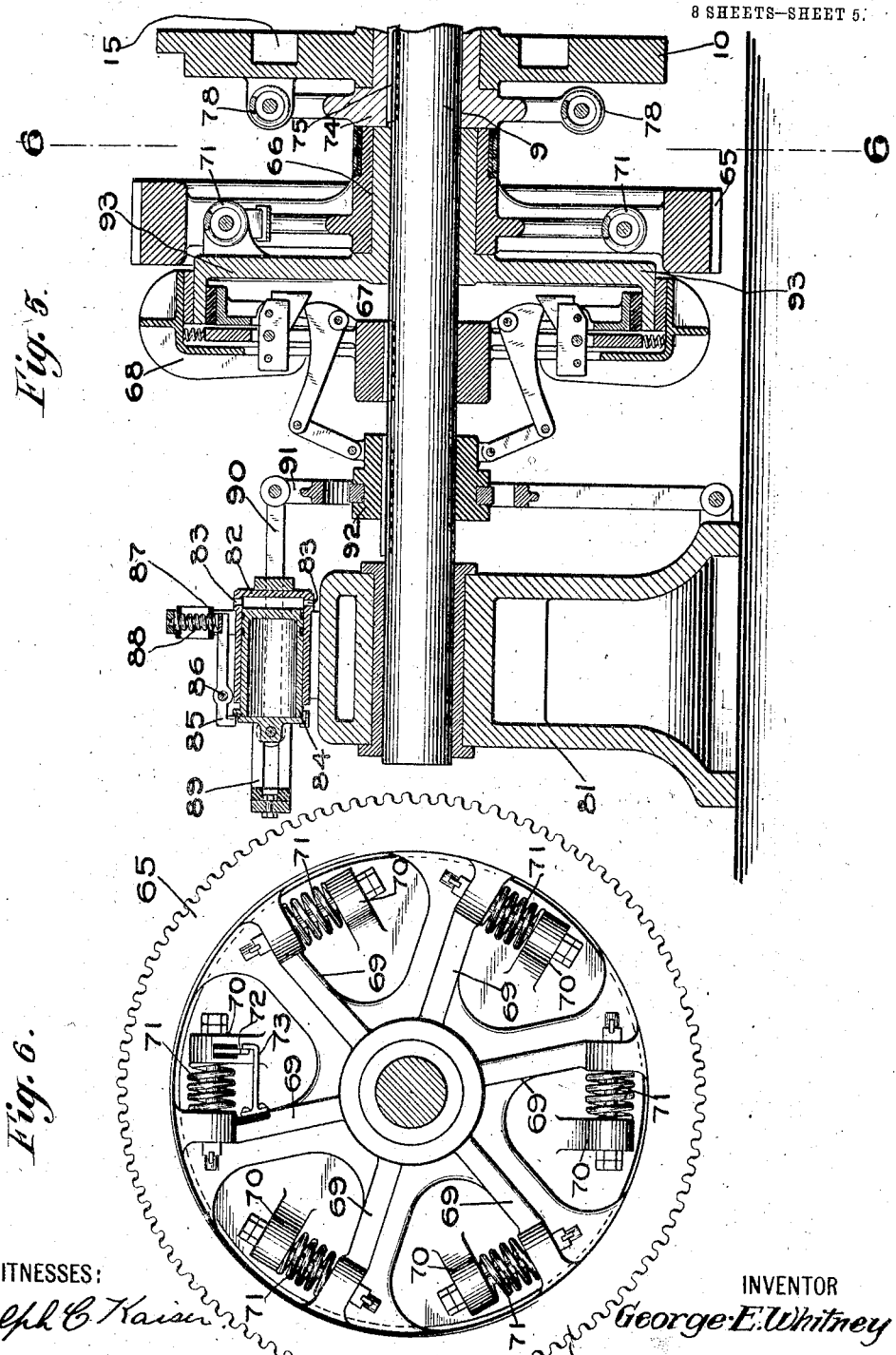

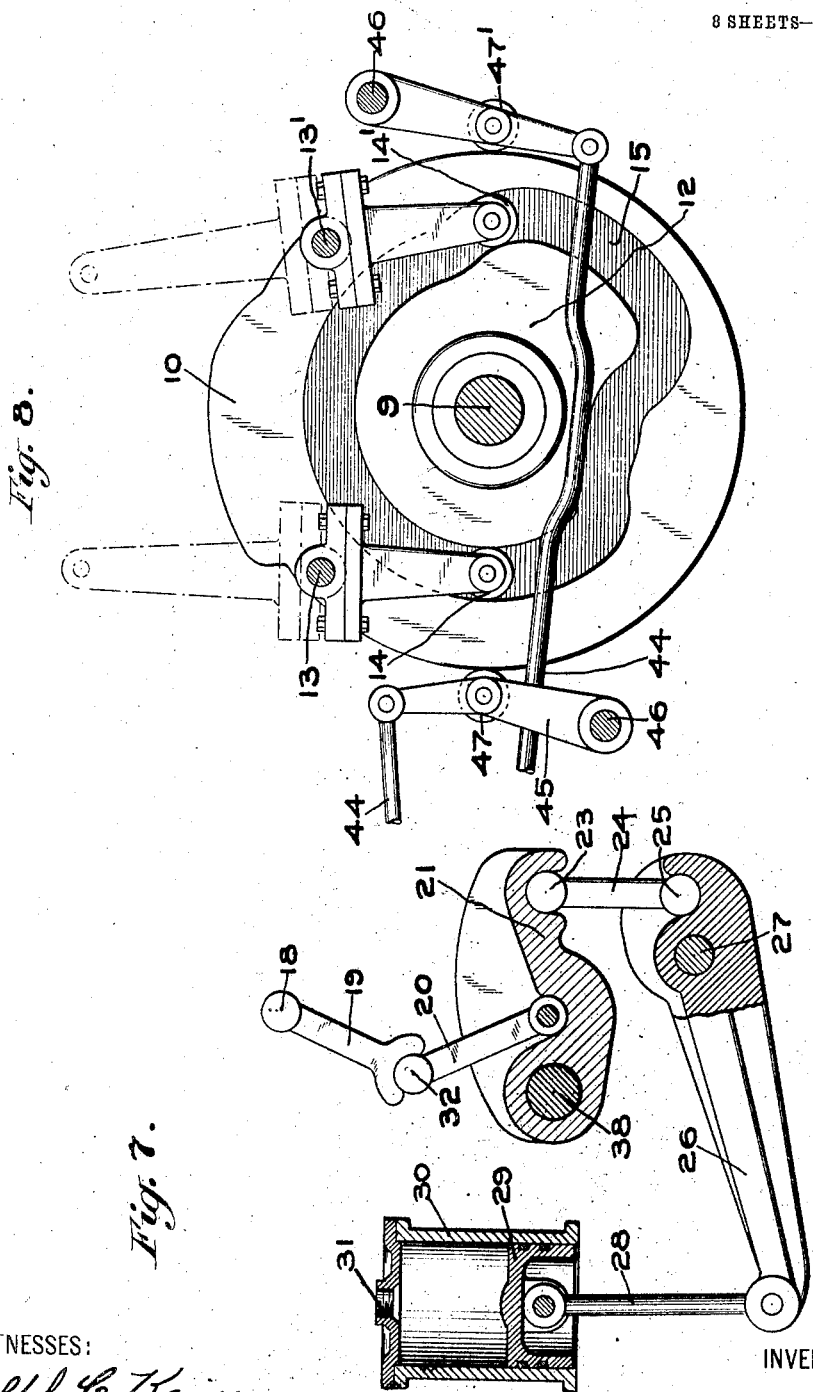

G. E. WHITNEY.
ASPHALT PRESS.
APPLICATION FILED OCT. 30, 1906.
1,007,831.
Patented Nov. 7, 1911.
8 SHEETS—SHEET 7.
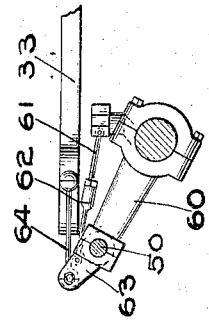
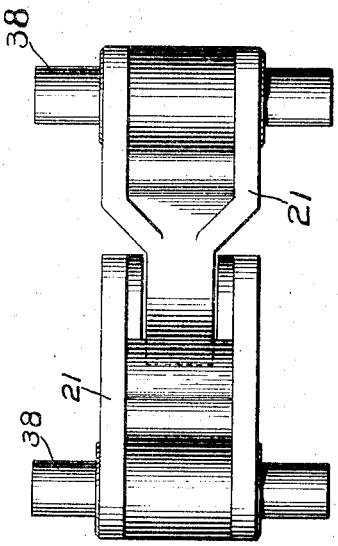
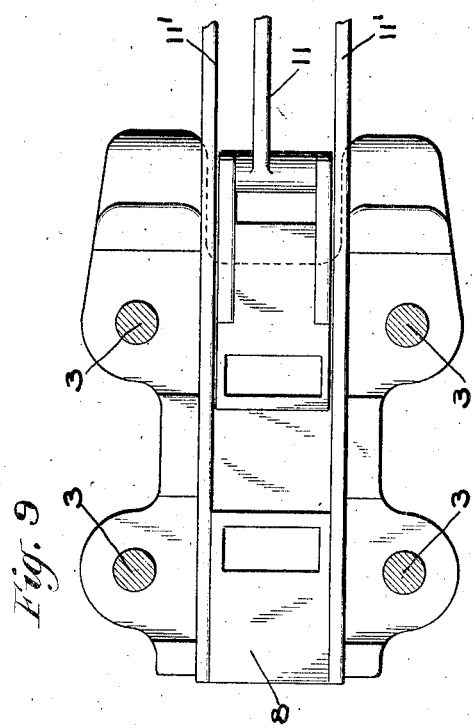
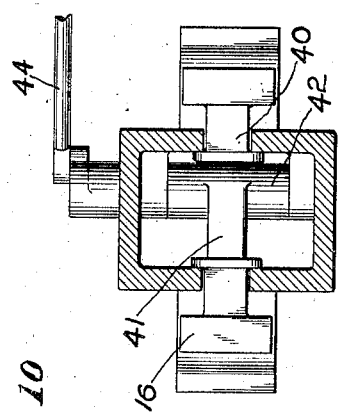
WITNESSES:
INVENTOR
George E. Whitney
BY Emery and Boot
ATTORNEYS

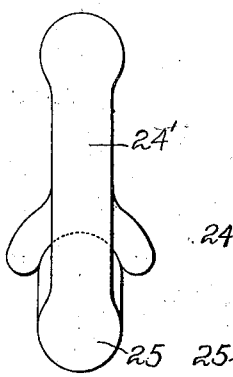
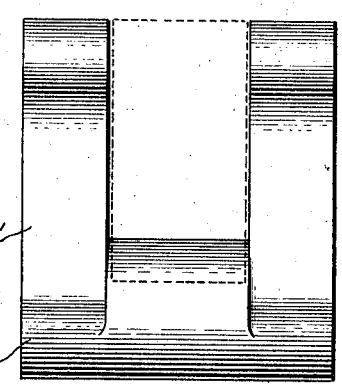
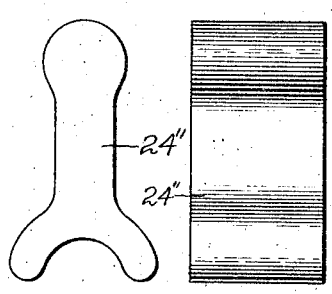
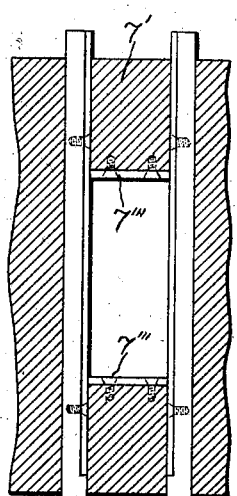
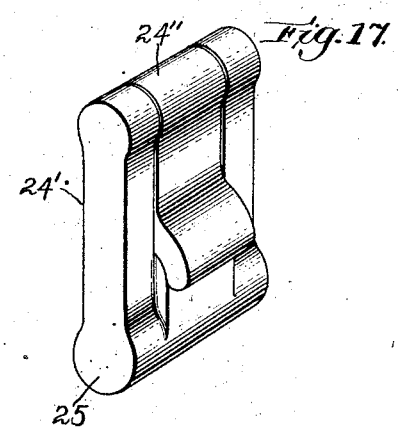

UNITED STATES PATENT OFFICE.

GEORGE E. WHITNEY, OF YONKERS, NEW YORK, ASSIGNOR TO THE INTERNATIONAL PAVEMENT COMPANY, OF HARTFORD, CONNECTICUT, A CORPORATION OF CONNECTICUT.

ASPHALT-PRESS.

1,007,831.

Specification of Letters Patent.

Patented Nov. 7, 1911.

Application filed October 30, 1906. Serial No. 341,335.

*To all whom it may concern:*

Be it known that I, GEORGE E. WHITNEY, a citizen of the United States, residing at Yonkers, in the county of Westchester, State of New York, have invented an Improvement in Asphalt-Presses, of which the following description, in connection with the accompanying drawings, is a specification, like letters on the drawings representing like parts.

This invention relates particularly to presses for compressing asphaltic or other blocks or tiles for paving and for other purposes, although certain features thereof are not restricted to use in such type of mechanism, but are of general application.

In the practice of my invention I am enabled so to compress asphaltic or other composition as to obtain very compact and solid blocks therefrom, the comminuted particles of which such blocks are usually composed, in conjunction with a cementitious binder, being brought into close and permanent union, so that much or all air may be expelled from the composition during the pressing action. I am further enabled by my invention, and with the expenditure of a substantially minimum amount of power, to compress a plurality of blocks during a single cycle of movements. These and many other desirable results are secured by my invention, one type or embodiment of which is herein set forth in order that the principles and general nature of the same may be understood, and is shown in the accompanying drawings, wherein,—

Figure 1:
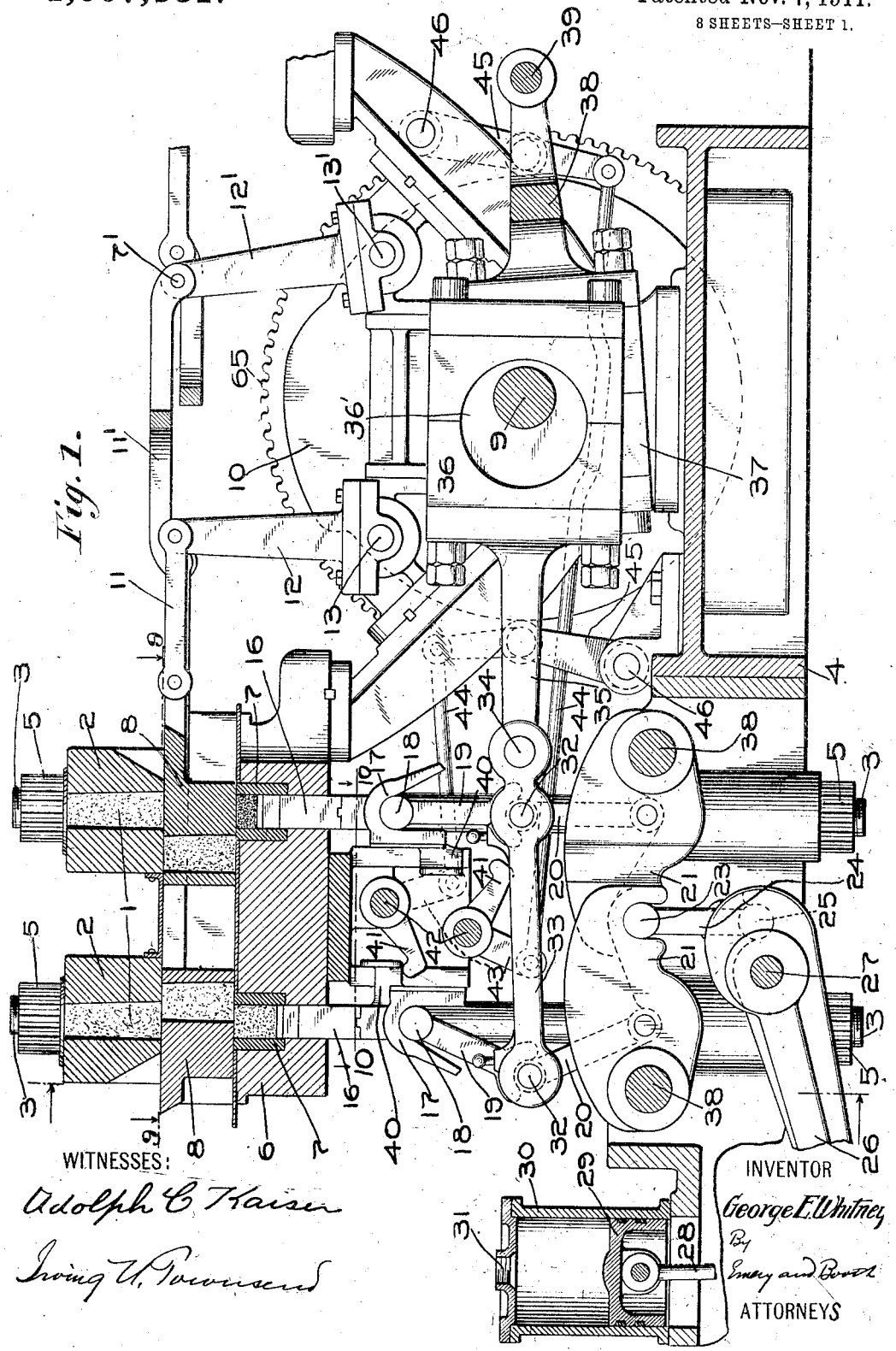
Figure 2:
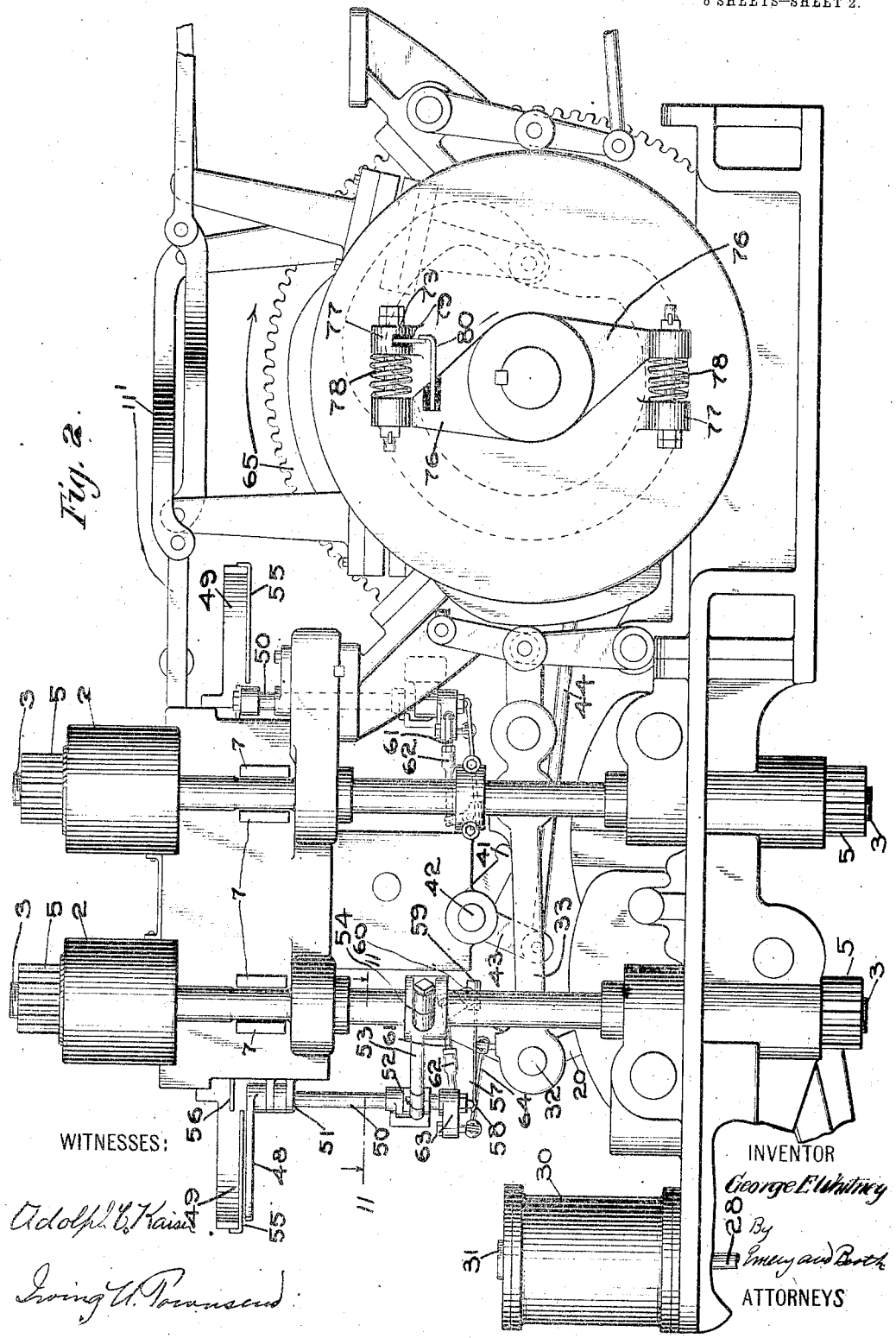
Figure 3:
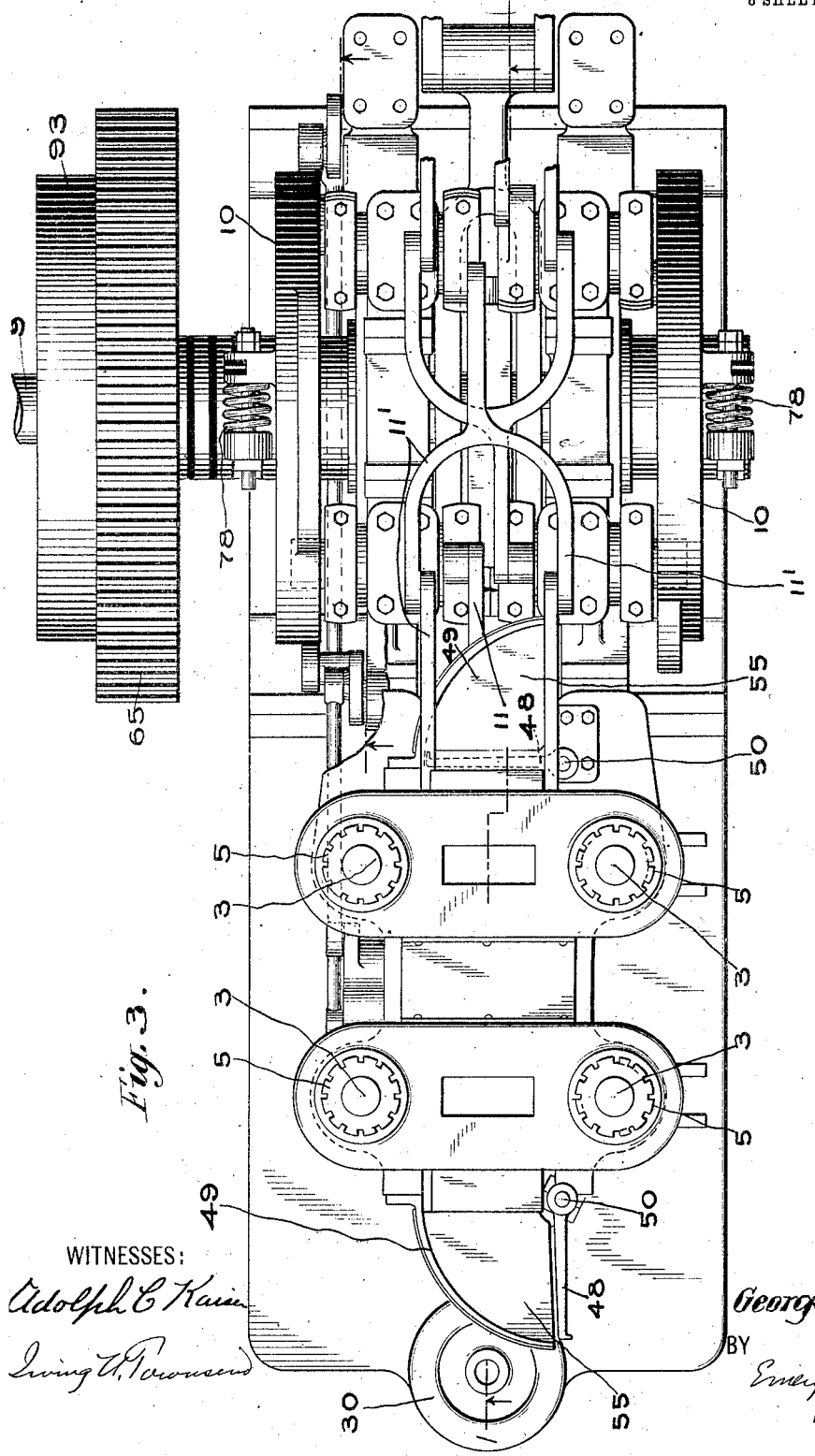

Figure 1 is a vertical central section of a press presenting one embodiment of my invention, taken on the broken line 1—1 of Fig. 3, the operating parts being shown mostly in elevation, and in this instance a plurality of molding or block forming means being shown; Fig. 2 is a side elevation of the same type of press; Fig. 3 is a plan view thereof; Fig. 4 is an end elevation thereof, looking from the left in Fig. 1; a portion of the framing being shown in elevation. Fig. 5 is a vertical central section through certain parts of the operating mechanism that are mounted upon the main driving shaft; Fig. 6 is a vertical section upon the line 6—6 of Fig. 5, looking from the right and showing one type of means for throwing the operating mechanism out of action when undue resistance is encountered in the pressing action; Fig. 7 is a vertical section with parts in elevation of a portion of the preferred operating means for one of the plungers, showing one type of maximum pressure support therefor. Fig. 8 is a detail showing operating mechanism herein represented as a cam for operating two of the mold feeding members and for imparting the ejecting movement to two of the plungers, which are typified in this form of press; Fig. 9 is a detail sectional view on the line 9—9 of Fig. 1, and showing in plan a plurality of mold feeding members and a portion of one form of operating means therefor; Fig. 10 is a section upon the line 10—10 of Fig. 1, looking down; Fig. 11 is a horizontal sectional detail on the line 11—11 of Fig. 2 with parts in elevation and showing a portion of the block discharging means; Fig. 12 is a plan view of a pair of interengaging levers of the maximum pressure sustaining means; Fig. 13 is an end elevation of the two part link for yieldingly supporting the said interengaging levers; Fig. 14 is a side elevation of the outer members of said two part link, the position of the inner member being indicated in dotted lines. Fig. 15 is an end elevation of the inner member of said two part link. Fig. 16 is a side elevation of said inner member; Fig. 17 is a perspective view of said two part link; and, Fig. 18 is a horizontal section through a mold member or block and representing in plan a form of liner back permitting ready removal of the liner.

The press herein shown and selected as embodying a type of my invention, is particularly adapted for compressing what are commonly known as asphalt paving blocks, ordinarily composed of trap rock and a cementitious asphaltic binder. So far as the broad features of my invention are concerned, it is immaterial what composition be employed, and I am in nowise limited to a press employed peculiarly for the purpose stated, as many of the features thereof are of general application.

In the particular type of press illustrated the block composition is preferably conducted from suitable mixing or preparing apparatus to the press, preferably through a hopper (not shown), the material being preferably heated to the proper temperature in any desired manner, and delivered into the vertical feeding openings or passages 1 provided in the horizontally disposed abutments 2, as shown in Fig. 1, one of which is preferably provided for each molding mechanism, provided more than one be employed. Each of said openings may taper slightly upwardly, and the openings beneath may be correspondingly sloped to facilitate the passage of the material. Each abutment is herein shown as fixed, being held in position by vertical tie rods or bolts 3, passing through the abutment and through the base, 4, of the press, nuts, 5, being preferably provided upon either end of each bolt or tie rod. Inasmuch as the material to be compressed is preferably subjected to very heavy pressure the parts should be strongly constructed to endure heavy strains.

If the press be vertically arranged, beneath each abutment, 2, 2' if a plurality thereof be employed, is provided a mold member or block 6, preferably having mold chambers 7 therein, each preferably having removable walls or mold defining members 7, 7' (Fig. 18). Preferably each wall comprises a liner back 7" and a liner 7"'. In order to permit the removal of worn liners during the operation of the press, I may, as indicated in Fig. 18, form certain of the liner backs, and as herein shown the side liner backs, of sufficient length to receive a plurality of liners 7"', which may be secured by screws or otherwise to the backs. When said side liner backs are in the position shown one liner of each of said backs is entirely exposed beyond the mold member or block, thereby permitting the removal of such liners, if worn, during the operation of the press and the substitution of unworn liners. Said backs may then be slid forward into the mold member or block until the substituted liners are in operative position, when the opposite liners, being fully exposed at the other side of the mold member or block, may be removed and others substituted. As herein shown, each mold member or block contains two mold chambers or molds, but it is apparent that a separate mold member or block may be provided for each mold chamber or mold.

Between the abutment or abutments, 2, 2' and the mold member or molds therein is preferably mounted a mold feeding member, 8. I have shown a separate mold feeding member for each mold, and preferably operate the same in sequence, but I may employ a unitary or connected mold feeding member suitably constructed to feed material to one of the molds while cutting off the supply from another mold when the presses are operated in sequence, it being understood, however, that for certain features of my invention it is immaterial whether or not the presses be operated in sequence.

In the type of pressing mechanism herein illustrated I have shown two molds with their related mold feeding members and plungers and I have illustrated the connections from the main driving shaft to two other molds and coöperating parts (not shown). That is to say, from the same driving shaft, I contemplate in this type of my invention operating four different presses, each of which is herein shown as adapted to compress material once during each rotation of the main driving shaft. I may, however, if I employ a plurality of presses, operate them as preferred with relation to each rotation of the driving shaft.

While I have illustrated mechanism for operating four presses and for operating the same during one rotation of the driving shaft, the number of presses employed is immaterial so far as the broad aspect of my invention is concerned. It will be observed that in the present type of the invention each pair of presses is independent of the other pair, so that if it be desired to disconnect one pair or to throw it out of action, while continuing the other in action, this may readily be done, it being apparent that if an accident happen to one pair of presses this need not interrupt the action of the other.

Preferably upon the horizontal main driving shaft 9 (Figs. 1 and 3) are mounted two cams 10, each of which is herein shown as adapted to operate two mold feeding members, but they may be otherwise mounted than on the main driving shaft and if desired a separate cam may be employed for each mold feeding member.

Referring to Fig. 1, in this embodiment of the invention the mold feeding member, 8, for the right-hand press is connected by a horizontal link, 11, to a vertical lever, 12, provided with a pivot, 13, (Figs. 1 and 8) having suitable bearings in the framework of the machine, the lower arm thereof having thereon a roller, 14, adapted to travel in a cam track 15, provided preferably in one face of the cam, 10. The mold feeding member, 5', for the left-hand press is here shown as connected by a forked link connection, 11', to a vertical lever, 12', provided with a pivot, 13', having bearings in the machine frame, the lower arm of said lever being provided with a roller, 14', here shown as likewise traveling in the same cam track, 15, in the path of the cam, 10. The construction of the cam track is preferably such that in one rotation of the main driving shaft each of said mold feeding members is given a complete reciprocation, as will be more fully described. Adapted to operate within each of the molds, 7, 7' (Fig. 1) is a vertically moving plunger, 16, 16' preferably provided at its lower end with a fork, 17, 17' within which is received the head, 18, 18' of the upper member, 19, 19' of a toggle lever, which I find to be well adapted to the attainment of the results desired in this type of press, and which I prefer to employ in this embodiment of my invention, said fork, 17, 17′ being provided as a ready means of positioning the upper member of the toggle mechanism and to shield the underlying parts from the material that is being operated upon. While the toggle or other operating mechanism for the plunger or plungers may in certain aspects or types of my invention be unyieldingly supported in the framework of the press or elsewhere, I prefer to support the same yieldingly and preferably so that when a certain predetermined maximum pressure has been applied thereby to the block or blocks subjected to the molding action, the plungers and the supporting mechanism may yield while still maintaining said predetermined maximum pressure until the completion of the pressing action, whereby the said block or blocks will not be subjected to an excessive compression and permitting the plungers to yield if a foreign substance of too great density finds its way into the mold chambers. This may be accomplished in many different ways and by many different types of apparatus, but I may conveniently employ the form of mechanism herein shown. To that end, the other member 20, 20′ of each toggle lever is preferably pivoted to a lever, 21, 21′ pivoted at 38, 38′ in the machine frame, the pair of levers shown being supported at their opposite ends upon the head, 23, of a two-part link, 24, the other head, 25, thereof, being received in a socket formed preferably at one end of a horizontal lever, 26, pivoted at 27, in the machine frame, the end of the lever having connected therewith the connecting rod, 28, of a piston, 29, mounted within a cylinder, 30, to which steam or other fluid is constantly supplied by a pipe connected with the opening, 31, in the upper head thereof.

As shown in Figs. 13-17 inclusive, the two-part link, 24, is composed of an outer and an inner member. The outer member, 24′, comprises the elongated head, 25, preferably having a rounded lower surface to be received in the socket in the lever, 26, and having uprising therefrom two end members, 24′, preferably having rounded upper ends to be received within sockets in the spaced end portion of one of the levers, 21, (see Figs. 1 and 12). The inner member 24″ has a socket in its enlarged lower end adapted to be received upon the upper side of the elongated head 25, of the outer member between the end members 24′ thereof, the upper end of said inner member preferably being rounded to be received within a socket of the outer lever 21, (see Fig. 12).
In the present embodiment of the invention a two-part link having relatively movable members is employed to permit movement of either lever 21, irrespective of the other. It is apparent that said levers 21 may be otherwise connected to the cylinder, 30, if such form of maximum pressure support is employed.

In the type of press shown the toggle mechanism for each press is connected at 32, 32′ to a horizontal link, 33, connected at 34, to an eccentric rod, 35, of an eccentric strap, 36, operated by an eccentric, 36′, preferably mounted upon the main driving shaft, 9. Thus, in the type of press illustrated I mount directly upon said driving shaft the eccentric mechanism for operating the plungers and the previously described cam mechanism for operating the mold feeding members. It is, however, within the scope of my invention to mount said operating parts other than as described and to impart the desired movement to the plungers other than by an eccentric mechanism and said plungers may be operated by separate driving connections.

In the type of press shown I contemplate, as already stated, employing two or other number of additional plungers and their related parts, and may conveniently connect them for operation with the said main driving shaft, 9. In so doing, there is preferably provided another eccentric mechanism 37 (see Fig. 1) upon the outer end of the eccentric rod, 38, of which is provided a suitable connection, 39, for operating said two other plungers, if such additional number be employed. When two other presses are employed I preferably provide (Fig. 3) another cam, 10, for operating the mold feeding members thereof and preferably so mount said cam as that the four or other suitable number of mold feeding members are operated in sequence, as will be more fully described.

Since, in the present type of the invention, the eccentric straps 36 and 37, and the two cams 10, are mounted upon the main driving shaft, 9, ninety degrees apart it will be observed that as here shown, in one rotation of the main driving shaft, one movement of compression is imparted to each plunger and that the eccentrics herein employed are so set that the pressing strain is brought upon the different plungers at different periods respectively in the rotation of the said main driving shaft. That is to say, and considering the present type of the invention, if at zero degrees of the rotation of the main driving shaft one of the plungers is at its highest position or position of maximum pressure, then at 180 degrees of rotation of the driving shaft, the other plunger of the pair of plungers will have arrived at a corresponding position. When two other plungers and co-related parts are employed, then at ninety degrees of rotation of said driving shaft the first of said other pair of plungers will have arrived at its highest position or position of maximum pressure, and at 270 degrees of rotation of said driving shaft the second plunger of the second pair will have arrived at the corresponding position. It will thus be seen that the strains involved in operating said plungers are preferably equally distributed throughout the rotation of the main driving shaft. It will be understood that whatever the number of plungers employed, I may, if desired, similarly distribute the strains thereof. The two cams, 10, are herein shown as so timed in operation that the power required to operate the mold feeding members for the four presses when that number is employed is preferably equally distributed throughout the rotation of the said driving shaft.

When a mold feeding member has been so positioned that the opening therein is in alinement with the mold and with the corresponding opening in the abutment, the material to be compressed will be discharged into the mold and when the same is filled, movement is imparted to the mold feeding member, preferably in the manner previously described, to bring the same into position to cut off further supply of material and also in this type of the invention, to present a pressure receiving portion thereof against which the block is compressed by the pressing action of the plunger; as shown at the right-hand press, viewing Fig. 1. It will be observed that by the use of the toggle mechanism, which I prefer to employ in this embodiment of the invention, a slow, powerful pressure is imparted to the plunger or plungers and that at the period of maximum pressure there is a considerable dwell so that the block is held under maximum compression for the desired length of time in order to compactly press the block and to force out of the same much of the air contained therein. Although I may accomplish the result in any suitable manner, I, in the present type of the invention, operate the plungers by the toggle levers 19 19' and 20 20'. At the culmination of the stroke the plunger remains stationary a sufficient length of time to permit the escape of most of the air contained in the material and to permit the ingredients of the now formed or pressed block to adhere firmly. After each block has been suitably pressed the corresponding plunger begins its withdrawal. In practice I find it preferable to compress the block to a thickness somewhat less than the desired dimension, as upon the withdrawal of the plunger the material slightly expands. Preferably, and in this type of the invention, just after the commencement of the withdrawing movement of the plunger, and therefore after the pressure has been released and the plunger is withdrawn beyond the limit of expansion of the compressed block, the mold feeding member corresponding thereto is further moved so as to bring the same into a position such that the compressed block may be ejected from the mold, which, in the present instance, is preferably done by the plunger. As each toggle lever recedes, it may slightly withdraw from the fork 17 17' of its plunger 16, 16' which follows owing to its own weight, and after the ejecting movement, readily seats itself upon the head of the upper toggle member owing to the enlarged mouth of the fork. Viewing Fig. 1, the compressed block formed by the left-hand press is ejected to the left of the mold feeding member when the same is properly positioned therefor and the block formed by the right-hand press is similarly ejected to the right of the corresponding mold feeding member when the same is properly positioned. I preferably employ the pressing plungers to eject the pressed blocks and to impart such ejecting movement I preferably provide (Fig. 1) an extension, 40, 40' near the lower end of each plunger with which coöperate arms, 41, 41' of bell-crank levers pivoted at 42, 42' in the machine frame, the other arms, 43, 43' whereof are connected by links, 44, 44' (Fig. 8) to levers, 45, 45' pivoted at 46 46' in the machine frame and having preferably mounted thereon rolls, 47, 47' adapted in this type of the invention, to be operated upon by a face cam upon one of the cams, 10. In the ejecting movement each plunger is lifted from its toggle but reseats itself under the influence of gravity. It will, of course, be understood that the ejecting movement of the plunger or plungers may be imparted by mechanism not operatively connected to said cam, 10. When I employ another pair or other number of additional presses, I preferably provide a similar mechanism for imparting the ejecting movement thereto, so that in practice each of the cams, 10, not only imparts in sequence the described movement to the mold feeding members, but also imparts in sequence the described ejecting movement to the plunger or plungers, if the ejecting movement be imparted through the plungers.

When a compressed block has been ejected from the mold wherein it was formed, it is received upon the upper face of the mold member, 6, or upon a plate provided thereon, and in this type of the invention, by the proper movement of the corresponding mold feeding member, is moved transversely of the press and preferably into the range (Figs. 2 and 3) of a horizontal pivoted arm, 48, preferably provided for each of the presses, so that in the preferred operation the compressed blocks are delivered correspondingly from each of the presses and preferably upon a traveling belt (not shown).

Any suitable means may be employed to act upon the compressed blocks after their ejection from the molds or presses to discharge them from the machine. I herein provide suitable arms, 48, and operate them in any desired manner.

I preferably provide for each press or mold )Figs. 2 and 3) a quadrant shaped trough or receiver, 49, upon which the compressed block is delivered by the action of the mold feeding member and from which the same is delivered in this type of the invention by the action of the corresponding arm, 48, which is mounted for oscillation upon a vertical rock-shaft, 50, mounted in an upper frame bracket, 51, and a lower bracket, 52, the latter being supported by the horizontal arm, 53, connected to the bracket, 54, upon a tie rod or bolt, 3, of the press. The bottom of each trough or receiver is herein shown as formed by a plate, 55, which is preferably formed separately from the trough and is bolted in position in any suitable manner, as shown in Fig. 4. I find it preferable in employing certain materials to form the bottom of the trough or receiver as a separate and detachable member, inasmuch as this part may be subjected to great wear and may need to be replaced at quite frequent intervals. As shown in Fig. 2, said bottom plate terminates short of one side of the trough and is located in a horizontal plane somewhat below the plane of a plate 56, here shown as directly above an upright rock-shaft, 50, carrying at its upper end the horizontal arm, 48. The said rock-shaft, 50, has imparted thereto in a manner to be described a movement of oscillation upon its axis, so that its arm, 48, is brought into a position to be raised against the under surface of the plate, 56, and to the rear of a compressed block that has been delivered upon the trough or receiver, 49, by the action of the mold feeding member. The described position of the arm, 48, is that shown for the right-hand press, viewing Fig. 3. The said rock-shaft, 50, has a lengthwise or axial movement imparted thereto (Fig. 2) by the action of a spring, 57, the outer end, 58, whereof, receives the lower end of said rock-shaft and the inner end whereof is connected to one arm, 59, of a lever pivoted at 60 (Fig. 2), the upper end whereof is connected to one end of a link, 61, (having therein an adjusting means, 62), the other end of which is connected (Fig. 2) to a bell crank lever, 63, mounted upon the said rock-shaft, 50. The other end of said bell crank lever, 63, is connected by a rod, 64, to a link, 33, of the plunger operating mechanism. The described construction is such that as the arm, 48, is brought into the position shown for the right-hand press in Fig. 3, the spring, 57, is by the action of the lever arm, 59, buckled or bent so that the rock-shaft, 50, is moved vertically and the arm, 48, thereon is brought into contact with the lower surface of the plate, 56. At the proper time, a further movement of partial rotation is imparted to the rock-shaft, 50, and the arm, 48, is thereby swept along the upper surface of the trough or receiver over the plate, 55, thereby ejecting the pressed block from the same preferably upon a traveling belt, the spring, 57, then assuming such position that the rock-shaft, 50, is permitted to descend and the arm, 48, is thereupon in its further movement carried beneath the plate, 55.

I contemplate imparting a heavy pressure in the formation of the blocks as described. It sometimes occurs, as through the entrance of a not readily compressible foreign composition into a block or into some portion of the press, that the material cannot be compressed to the desired dimensions by such pressure as I may desire to subject the press to. I have, therefore, in this embodiment of my invention, provided means whereby, if undue resistance be met in the pressing action, the pressing mechanism may be thrown out of operation. That is to say, if undue strain be brought upon the main drive shaft, 9, the driving mechanism mounted thereon may be thrown out of operation. Owing to the fact that the fly wheel (not shown) carried by the drive shaft rotates at a high speed, in order to avoid damage to the parts, it is preferable to disconnect or throw out of operation the driving mechanism instantaneously upon the occurrence of undue resistance of the character indicated. While for this purpose any suitable means may be provided, I have herein chosen to illustrate as typifying my invention, electrical means for throwing the mechanism out of operation, one form of which I will now describe. For this purpose (Figs. 3 and 5) the main driving gear, 65, to which power is applied, is provided with a hub, 66, carried upon a sleeve, 67, loosely mounted upon the main driving shaft but adapted to be clutched thereto by a clutch, 68, of any desired construction, splined upon the main driving shaft, said driving gear, 65, having arms, 69, between which and lugs, 70, extending from the disk carried by the sleeve, 67, are mounted coiled springs, 71, acting in the normal operation of the parts to retain the arm, 69 and lugs 70, separated as shown in Fig. 6. Upon one of the lugs, 70, is mounted a projecting stud, 72, suitably insulated therefrom and forming a terminal of an electric circuit and upon the corresponding arm, 69, is mounted a suitably insulated member, 73, forming another terminal of the circuit and adapted in the normal operation of the press to contact therewith, so that the circuit is uninterrupted. If an undue resistance be brought upon the main drive shaft, the springs, 71, are compressed and the circuit is broken.

It sometimes happens that foreign hard and incompressible non-shearing substances are fed into the feeding openings provided in the abutments and project into an opening in a mold feeding member so as to interfere with the normal movement of the same with relation to the abutment. Under such contingencies, were no provision made for interrupting the described movement of the feeding member, serious damage might result. To obviate this result, I have in this type of the invention, provided mechanism whereby upon meeting an undue resistance a mold feeding member may be thrown out of operation. This may be accomplished in many different ways and by a variety of mechanisms, but I have herein selected the following means as typifying one embodiment of the invention. Each cam, 10 (Fig. 5), is preferably mounted upon a sleeve, 74, splined at 75, to the main driving shaft, each sleeve having (Fig. 2) arms, 76, projecting therefrom, between the heads of which and lugs, 77, upon said cam, 10, are mounted coiled springs, 78, of suitable strength, the construction being such that under normal conditions a stud, 79, projecting and suitably insulated from one of the lugs, 77, is kept in contact with a stud, 80, projecting and suitably insulated from one of the arms, 76, said stud, 79, and stud, 80, being suitably connected in circuit so that in the normal operation of the parts the circuit is uninterrupted, but permitting the throwing of the driving mechanism out of gear in the event of an undue obstruction being presented to the movement of a mold feeding member.

I have thus provided and disclosed one embodiment of means whereby when undue strain is brought upon the driving shaft, or when undue resistance is met by any one of the mold feeding members, the plungers may be thrown out of operation and the parts controlled by the cams, 10, may be rendered inoperative. It is within the scope of my invention to provide similar or other means at such parts of the press as may be desired to accomplish a similar result.

Any suitable mechanism may be employed to coöperate upon the breaking of a circuit in the manner described, to throw the main driving gear out of operation, but as effective for the purpose and referring to Fig. 5, upon a support, 81, for the main driving shaft is mounted a cylinder, 82, having openings, 83, at one end thereof. The upper opening is adapted to be supplied in any desired manner with steam or other suitable fluid, and the lower opening is preferably connected by piping to the cylinder, 30, forming in this type of the invention, a part of the maximum pressure means. Thus, steam or other pressure acts constantly upon the rear end of a piston, 84, mounted within the cylinder for longitudinal movement therein, but locked from outward movement by the hooked end of a lever, 85, pivoted at 86, and constituting an armature normally held in the position shown in Fig. 5, by a magnet, 87, forming a part of the electric circuit referred to. A coiled spring, 88, is employed, the strength of which is insufficient to depress the armature when the circuit remains unbroken. When, however, the circuit has been broken in the manner previously described, said spring depresses the long arm of the lever, 85, raising the outer hooked end thereof out of engagement with the piston, whereupon the latter is moved outwardly along a guide way, 89, shown more clearly in Fig. 4. Connected with said piston is a horizontal link, 90, pivoted to a vertical lever, 91, which is connected with a sleeve, 92, splined upon the main driving shaft. The outward travel of said piston, 84, moves said sleeve, 92, to the left, viewing Fig. 5, and thereupon through any preferred connections, releases the clutch from engagement with the projecting member or web, 93, formed with said sleeve, 67, leaving the said sleeve and the main driving gear, 65, loose upon the main drive shaft, 8, so that power applied to said gear, 65, no longer drives the shaft.

One embodiment or type of my invention having thus been described, and the operation thereof sufficiently set forth, it will be understood that when I employ two presses, the same preferably and as herein shown operate in alternation and when I employ more than two presses, as, for example, four, I preferably operate them in sequence, as described, so as to distribute the power required to operate the same equally upon the main driving shaft. Considering two presses, as fully shown in the drawings, it will be understood that as one of the plungers is receding, the mold therefor begins to fill. When the mold has been filled, in this embodiment of the invention, sliding movement is imparted to the mold feeding member, so that the supply of material is then cut off and a pressure receiving portion of the mold feeding member is brought into position above the mold. The plunger is then raised to compress the material and at the maximum height of the movement of the plunger a dwell of considerable length occurs, in the present type of the invention, so as thoroughly to compress the material. The plunger then begins its recession and the mold feeding member is thereupon slid into position for ejection of the compressed block. Thereupon ejecting movement is imparted to the plunger and the compressed block is delivered upon the upper face of the mold member. Owing to the described operation of the plungers, and their correlated parts in alternation in this type of the invention, it will be understood that the foregoing cycle of operations imparted to each plunger and its correlated mold feeding member is likewise imparted to the other plunger and its co-related mold feeding member of the same pair of presses and that each movement of one element of one of the presses is undergone at a different period of time, and correspondingly at the opposite period of time, by the corresponding element of the press.

Having thus described my invention and one embodiment thereof, I wish it to be understood that while I have described the same in detail and have employed specific terms in doing so, I have used the terms in their general and not in their subordinate sense. I am, therefore, not to be limited save as in the claims hereto annexed.

1. A press of the character described comprising a fixed compression head comprising an abutment, an opposing plunger, means to move said plunger toward said head to compress the material therebetween, and elastic fluid actuated excessive compressive movement preventing connections for said plunger whereby an increase of compressing action ceases when a maximum pressure shall have been attained, said connections maintaining an unvarying, predetermined maximum pressure.

2. A press of the character described comprising a fixed abutment, an opposing plunger, means to impart an unvarying range of movement to said plunger provided a maximum pressure be not exceeded, an elastic fluid sustained means to maintain a uniform predetermined maximum pressure.

3. A press of the character described comprising a fixed abutment, an opposing plunger, operating toggle mechanism therefor, and elastic fluid sustained yielding supporting means to support said toggle mechanism and adapted to yield when a maximum plunger pressure is reached, said supporting means maintaining a uniform, maximum pressure.

4. A press of the character described comprising a fixed abutment, an opposing plunger, toggle mechanism to operate the same, and yielding supporting means to support said toggle mechanism and adapted to yield when a maximum plunger pressure is reached, but to maintain a uniform, maximum pressure.

5. A press of the character described comprising a fixed abutment, an opposing plunger, toggle mechanism to operate the same, and fluid pressure controlled means to support said toggle mechanism, with uniform pressure variable in degree.

6. A press of the character described comprising a fixed compression head forming an abutment, an opposing plunger, plunger operating means to move said plunger toward said head to compress the material therebetween, and elastic fluid sustained maximum pressure sustaining and excess pressure preventing connections for said plunger, said connections maintaining a predetermined, maximum pressure.

7. A press of the character described comprising an abutment, an opposing plunger, toggle mechanism to operate the same, and pressure controlled means to support said toggle mechanism, said means maintaining a predetermined, uniform, maximum pressure.

8. A press of the character described comprising a fixed abutment, an opposing plunger, toggle mechanism to support the same, and elastic fluid pressure controlled means supporting said toggle mechanism with a predetermined maximum pressure.

9. A press comprising in combination a fixed abutment; a mold; a plunger reciprocable in said mold to compress material resisted by said abutment; fixed-travel pressure actuating means; transmission means having the capacity to transmit a portion only of the fixed travel of said pressure actuating means to said plunger; and elastic fluid means having the capacity to absorb the movement occasioned by the remainder of said fixed travel, said elastic fluid means acting as a controller to fix a predetermined maximum pressure transmitted from said pressure actuating means to said plunger.

10. A press of the character described comprising a fixed abutment, a movable plunger coöperating therewith, a mold feeding member between said abutment and plunger, plunger operating mechanism and elastic fluid sustained yielding supporting means to support said plunger operating mechanism and adapted to yield when a maximum plunger pressure is reached, and to maintain a predetermined, uniform, maximum pressure.

11. A press of the character described comprising fixed abutments, a plurality of plungers coöperating in sequence therewith, mold feeding members between said abutments and plungers and movable transversely to the path of movement of said plungers and a single pressure means to support said plungers and adapted to yield when a maximum plunger pressure is reached on any one of said plungers.

12. A press of the character described comprising a fixed abutment, an opposing plunger, toggle mechanism to operate the same, and elastic fluid sustained pressure controlled means to support said toggle mechanism, said pressure controlled means maintaining a predetermined, uniform, maximum pressure.

13. A press of the character described comprising a fixed abutment, a plunger movable relatively thereto, a movable mold feeding member between said abutment and plunger, toggle mechanism for operating said plunger, means positively to operate said toggle mechanism in each direction, and elastic fluid pressure means yieldingly to support said toggle mechanism.

14. A press of the character described comprising a fixed abutment, a plunger movable relatively thereto, operating means therefor, a movable mold feeding member between said abutment and plunger and an elastic fluid sustained supporting means to support said plunger operating mechanism and adapted to yield when a maximum plunger pressure is reached, and to maintain a predetermined, uniform, maximum pressure.

15. A press of the character described comprising fixed abutments, plungers acting in sequence movable relatively thereto, operating means therefor, movable mold feeding members between said abutments and plungers, and a single pressure means to control a plurality of plungers and adapted to yield when a maximum plunger pressure is reached.

16. A press of the character described comprising a fixed abutment, a plunger movable relatively thereto, plunger operating means therefor, a movable mold feeding member between said abutment and plunger having a passage therethrough for the material to be compressed and elastic fluid sustained supporting means to support said plunger operating mechanism and adapted to yield when a maximum plunger pressure is reached, and to maintain a predetermined, uniform, maximum pressure.

17. A press of the character described comprising fixed abutments, plungers movable in sequence relatively thereto, plunger operating means therefor, a movable mold feeding member between said abutments and plunger having a passage therethrough for the passage of the material to be compressed and a single pressure means to control a plurality of plungers and adapted to yield when a maximum plunger pressure is reached on any one of said plungers.

18. A press of the character described comprising a fixed abutment, a mold member, a plunger movable therein, a mold feeding member between said abutment and mold member, toggle mechanism for operating said plunger, positive means to operate said toggle mechanism in each direction, elastic fluid sustained means yieldingly supporting said toggle mechanism and adapted to yield when a maximum pressure is reached, and means distinct from said toggle mechanism to eject the compressed material.

19. A press of the character described comprising a fixed abutment, a mold member, a plunger movable therein, a movable mold feeding member between the abutment and mold member, plunger operating mechanism and elastic fluid sustained yielding supporting means to support said plunger operating mechanism and adapted to yield when a maximum plunger pressure is reached, and to maintain a predetermined, uniform, maximum pressure.

20. A press of the character described comprising fixed abutments, mold members, plungers acting in sequence movable therein, movable mold feeding members between the abutments and mold member, plunger operating mechanism, and a single pressure means to control a plurality of plungers and adapted to yield when a maximum plunger pressure is reached on any one of said plungers.

21. A press of the character described comprising a fixed abutment having a feeding neck, a mold member, a plunger movable therein, a movable mold feeding member between the abutment and mold member, toggle mechanism for operating said plunger, means positively to operate said toggle mechanism in each direction, and yielding supporting means for said toggle mechanism adapted to yield when a maximum plunger pressure is reached, but to maintain a predetermined maximum pressure.

22. A press of the character described comprising a fixed abutment having a feeding neck, a mold member, a plunger movable therein, a movable mold feeding member, between the abutment and mold member, plunger operating mechanism, and elastic fluid sustained supporting means to support said plunger operating mechanism and adapted to yield when a maximum plunger pressure is reached, but to maintain a uniform, predetermined, maximum pressure.

23. A press of the character described comprising a fixed abutment, a mold member, a plunger movable therein, a mold feeding member movable transversely to the path of said plunger and having a mold feeding passage and a pressure receiving portion, toggle mechanism to operate said plunger, means positively to operate said toggle mechanism in each direction, and elastic fluid actuated mechanism to support said toggle mechanism and adapted to yield when a predetermined, maximum pressure is reached.

24. A press of the character described comprising a fixed abutment, a mold member, a plunger movable therein, plunger operating mechanism, a mold feeding member movable transversely to the path of said plunger, and having a mold feeding passage and elastic fluid sustained pressure receiving portion, yielding supporting means to support said plunger operating mechanism and adapted to yield, when a maximum plunger pressure is reached, but to maintain a predetermined, uniform, maximum pressure throughout the pressing action.

25. A press of the character described comprising a fixed abutment having means to feed the material therethrough, an opposing plunger having a fixed range of movement provided a maximum pressure be not exceeded, a mold member within which the plunger is adapted to move, a mold feeding member between the abutment and mold, elastic fluid sustained yielding supporting means to support said plunger operating mechanism and adapted to yield when a maximum plunger pressure is reached, but to maintain a predetermined, uniform, maximum pressure throughout the pressing action.

26. A press of the character described comprising pressure receiving means, a plurality of plungers coöperating therewith, coöperating mold feeding means, means to operate said plungers in sequence, and yielding means to support said plunger operating means and adapted to yield when a maximum plunger pressure is reached but to maintain a maximum pressure.

27. A press of the character described comprising pressure receiving means, a plurality of plungers coöperating therewith, means to operate said plungers out of unison, and yielding means to support said plunger operating means and adapted to yield when a maximum plunger pressure is reached but to maintain a maximum pressure.

28. A press of the character described comprising unyielding pressure receiving means, a plurality of plungers coöperating therewith, coöperating mold feeding means, means to operate said plungers in sequence and yielding means to support said plunger operating means and adapted to yield when a maximum plunger pressure is reached but to maintain a maximum pressure.

29. A press of the character described comprising pressure receiving means, a plurality of plungers coöperating therewith, plunger operating mechanism, a lever supporting each plunger operating mechanism, and a single pressure means to control said levers and adapted to yield when a maximum plunger pressure is reached, but maintaining said maximum pressure throughout the pressing action.

30. A press of the character described comprising unyielding pressure receiving means, a plurality of plungers coöperating therewith, a mold feeding member, a common maximum pressure sustaining means for said plungers, and means to operate said plungers in sequence, said sustaining means operating a plurality of times during the cycle of operation of each plunger.

31. A press of the character described comprising pressure receiving means, a plurality of plungers coöperating therewith, plunger operating mechanism, a lever supporting each plunger operating mechanism and a single pressure means to control said levers and adapted to yield when a maximum plunger pressure is reached, said sustaining means operating a plurality of times during the cycle of operation of each plunger.

32. A press of the character described comprising unyielding pressure receiving means, a plurality of plungers coöperating therewith, means to operate said plungers out of unison, a lever supporting each plunger operating mechanism and a single pressure means to control said levers and adapted to yield when a maximum plunger pressure is reached, said sustaining means operating a plurality of times for each operation of each plunger.

33. A press of the character described comprising unyielding pressure receiving means, a plurality of plungers coöperating therewith, toggle mechanism to operate said plungers in sequence, a lever to support each toggle mechanism, and a single pressure means to control said levers and adapted to yield when a maximum plunger pressure is reached, said sustaining means operating a plurality of times during the cycle of operation of each plunger.

34. A press of the character described comprising unyielding pressure receiving means, a plurality of plungers coöperating therewith, toggle mechanism for each plunger and connections therewith to operate said toggle mechanisms in sequence, a lever supporting each toggle mechanism, a two part link supporting said levers, and a single pressure means supporting said link and adapted to yield when a maximum plunger pressure is reached.

35. A press of the character described comprising unyielding pressure receiving means, a plurality of plungers coöperating therewith, toggle mechanism for each plunger, connections therewith to operate the same in sequence, interengaging levers to support said toggle mechanisms respectively, a two part link operatively connected with the interengaging portions of said levers, and a single pressure means supporting said link and adapted to yield when a maximum plunger pressure is reached.

36. A press comprising in combination unyielding pressure receiving means; a mold; a mold cover; operating means to change the relative position of said mold and mold cover; a mold plunger; a fixed throw pressure actuator; pressure transmission means to transmit a portion of the fixed throw of said pressure actuator to said mold plunger to effect compression of material in said mold; a fluid containing cylinder to limit the pressure imparted to said mold plunger and to curtail the stroke thereof; reducing means connecting said fluid cylinder with said pressure transmission means, whereby pressure imparted by said pressure transmission means to said reducing means may be imparted in a reduced degree to said fluid cylinder; and automatic timing means to time the relative operation of said operating means and said fixed throw pressure actuator.

37. A press of the character described comprising pressure receiving means, a plurality of plungers coöperating therewith, maximum pressure sustaining means for said plungers adapted to yield when a maximum pressure is reached and to maintain a predetermined, uniform, maximum pressure, means to impart pressing action to said plungers in sequence and ejecting means, acting in sequence, to eject the compressed material.

38. A press of the character described comprising unyielding pressure receiving means, a plurality of plungers coöperating therewith, maximum pressure sustaining means for said plungers adapted to yield when a maximum pressure is reached and to maintain a predetermined, uniform, maximum pressure, means to impart pressing action to said plungers in sequence and ejecting means, acting in sequence, to eject the compressed material.

39. A press of the character described comprising a fixed abutment, a plurality of mold members, plungers movable therein, a common means to impart pressing movement to said plungers in sequence, ejecting means acting in sequence to eject the material from the mold, and a single yielding means to support the means for imparting pressing movement to the plungers.

40. A press of the character described comprising a fixed abutment, a plurality of mold members, plungers movable therein, plunger operating mechanism, connections therefrom to operate the same in sequence, ejecting means acting in sequence to eject the material from the molds and yielding supporting means to support said plunger operating mechanism and adapted to yield when a maximum plunger pressure is reached, and to maintain a uniform, predetermined, maximum pressure.

41. A press of the character described comprising an abutment, a plurality of mold members, plungers movable therein, a common means to operate said plungers in sequence, ejecting means to impart ejecting movement to said plungers in sequence, and yielding means to support said plunger operating means and adapted to yield when a predetermined maximum pressure is reached and to maintain such pressure throughout the pressing action.

42. A press of the character described comprising an abutment, a plurality of molds, a movable mold feeding member for each mold, plungers movable in said molds, means for imparting movement in sequence to said mold feeding members and to said plungers, and yielding means to support said plunger operating means and adapted to yield when a predetermined maximum pressure is reached and to maintain such pressure throughout the pressing action.

43. A press of the character described comprising pressure receiving means, a plurality of plungers coöperating therewith, maximum pressure sustaining means for said plungers, adapted to yield when a maximum pressure is reached, but to sustain a predetermined, uniform, maximum pressure throughout the pressing action, and a common plunger operating means to operate the same in sequence.

44. A press of the character described comprising pressure receiving means, a plurality of plungers coöperating therewith, maximum pressure sustaining means for said plungers, a common plunger operating means to operate the same in sequence, and ejecting means acting in sequence to eject the pressed material adapted to yield when a maximum pressure is reached, but to sustain a predetermined, uniform, maximum pressure throughout the pressing action.

45. A press of the character described comprising an abutment, a plunger coöperating therewith, operating means therefor, positively acting means operative upon undue resistance being encountered in the pressing action of said plunger, to render said operating means inactive, and mechanism distinct from said plunger operating means and acting positively to render said operating means inactive upon the occurrence of undue resistance.

46. A press of the character described comprising pressure receiving means, a plurality of plungers coöperating therewith, crank mechanism for operating said plungers in sequence, and yielding means to support said plunger operating means and adapted to yield when a maximum plunger pressure is reached but to maintain a maximum pressure throughout the pressing action.

47. A press of the character described comprising pressure receiving means, a plurality of plungers coöperating therewith, a mold feeding member, a shaft, eccentric mechanism thereon, plunger operating mechanism for imparting during a single rotation of said shaft, pressing movement to each of said plungers, and yielding means to support said plunger operating means and adapted to yield when a maximum plunger pressure is reached.

48. A press of the character described comprising pressure receiving means, a plurality of plungers coöperating therewith, plunger operating means to actuate each of said plungers, a mold feeding member, a single operating shaft, connections to distribute about said shaft the strains incident to the operation of the plunger operating means, and yielding means to support said plunger operating means and adapted to yield when a maximum plunger pressure is reached.

49. A press of the character described comprising an abutment, a series of molds, a series of plungers coöperating therewith, maximum pressure sustaining means for said plungers adapted to yield when a maximum pressure is reached, but to maintain a predetermined, uniform, maximum pressure, movable mold feeding members, and means to impart in sequence pressing and ejecting movement to said plungers, and feeding movement to said mold feeding members.

50. A press of the character described comprising an abutment, a plunger coöperating therewith, operating means therefor, a drive shaft, driving mechanism for the plunger normally fast thereon, an electric circuit normally unbroken, and fluid pressure means whereby upon undue resistance being encountered by the plunger the circuit is interrupted and said operating means is rendered inactive.

51. A press of the character described comprising an abutment, a plunger coöperating therewith, operating means therefor including a drive shaft and driving mechanism thereon, and electrically controlled fluid pressure means for rendering said operating means inactive upon undue resistance being encountered by the plunger.

52. A press of the character described comprising an abutment, a plunger coöperating therewith, operating means therefor, a drive shaft, driving mechanism thereon, an electric circuit, a spring to maintain the same normally unbroken and adapted upon the plunger encountering undue resistance to be compressed to break the circuit, and elastic fluid actuated connections whereby upon the circuit being broken said operating means for the plunger is rendered inactive.

53. A press of the character described comprising an abutment, a plunger coöperating therewith, operating means therefor, a drive shaft, a driving gear thereon and normally clutched thereto, fluid pressure means tending to unclutch said driving gear, and electrically controlled means to render said fluid pressure means ineffective under normal working conditions.

54. A press of the character described comprising an abutment, a plunger coöperating therewith, a movable mold feeding member to feed material into the range of movement of the plunger, a mold emptying member, mold emptying member operating means, and means whereby said mold emptying member operating means is rendered inactive if undue resistance be encountered thereby.

55. A press of the character described comprising pressure receiving means, a plurality of plungers coöperating therewith, movable mold feeding members to feed material into the range of movement of said plungers, mold feeding member operating means, plunger operating mechanism, a single pressure means to control a plurality of plungers and adapted to yield when a maximum plunger pressure is reached and means whereby said mold feeding members are rendered inactive if undue resistance be encountered thereby.

56. A press of the character described comprising an abutment, a coöperating plunger, a delivery sweep arm to deliver material from the press and means for imparting delivery movement thereto in one plane, and return movement thereto in a different plane.

57. A press of the character described comprising an abutment, a coöperating plunger, a shaft having material delivering means thereon, means to impart rotative movement to said shaft to deliver the material from the press, and means to impart axial movement to said shaft.

58. A press of the character described comprising an abutment, a coöperating plunger, a receiver whereon the pressed material is delivered, delivery means to sweep the material across the face of said receiver, and mechanism to impart return movement to said delivery means beneath said face of the receiver.

59. A press of the character described comprising an abutment, a plunger coöperating therewith, delivery means to discharge material from said press in a substantially horizontal plane, and mechanism to impart motion to said delivery means in two different horizontal planes.

60. A press comprising in combination unyielding pressure receiving means; a mold; a mold cover; operating means to change the relative position of said mold and mold cover; a mold plunger; a fixed throw pressure actuator; pressure transmission means to transmit a portion of the fixed throw of said pressure actuator to said mold plunger to effect compression of material in said mold; an elastic fluid containing cylinder to limit the pressure transmitted to said mold plunger and to curtail the stroke thereof; reducing means connecting said elastic fluid cylinder with said pressure transmission means, whereby pressure imparted by said pressure transmission means to said reducing means may be imparted in a reduced degree to said elastic fluid cylinder; and automatic timing means to time the relative operation of said operating means and said fixed throw pressure actuator.

61. A press of the character described comprising a fixed abutment, a plunger coöperating therewith, plunger operating means adapted to impart a plunger stroke of gradually diminishing speed and gradually increasing force and maximum pressure determining means permitting an extended period of dwell at the limit of the compressing stroke of the plunger, and mechanism to impart a positive movement to said operating means in both directions.

62. A press of the character described comprising an abutment, a plunger coöperating therewith, and a mold member having a removable liner back, said liner back having thereon a plurality of liners, said liner back being of such extended area that said liners may be attached thereto with but a single liner in operative relation to the press, another liner being exposed whereby the same may be removed from the liner back during the operation of the press.

63. A press of the character described comprising an abutment, a plunger coöperating therewith, a mold member having a removable liner back, said liner back being elongated and having secured thereto in longitudinal alinement a plurality of removable liners, whereby while one liner is in effective relation to the press another liner is exposed and in position for removal from the liner back during the operation of the press.

64. A press of the character described comprising an abutment, a plunger coöperating therewith, a mold member having opposite removable side liner backs, each liner back being elongated to receive thereon removable longitudinally arranged liners, whereby one liner of each back may be in operative relation to the mold member and another liner may be exposed for removal during the operation of the press.

65. A press of the character described comprising unyielding pressure receiving means, a plurality of plungers coöperating therewith, operating mechanism for each plunger and connections therewith to operate said toggle mechanisms in sequence, a yielding support for each plunger operating mechanism, a two part link sustaining said yielding supports and a single pressure means supporting said link and adapted to yield when a maximum plunger pressure is reached.

66. A press of the character described comprising an abutment, a plunger coöperating therewith, operating means therefor, and means distinct from said plunger and its operating means operative upon undue resistance encountered in the pressing action of said plunger to render said operating means inactive by withdrawing a portion thereof from operative position.

67. A press comprising in combination a mold; a mold cover held against movement by the pressure imparting instrumentalities; operating means to change the relative position of said mold and mold cover; a mold plunger; a fixed throw pressure actuator; pressure transmission means to transmit a portion of the fixed throw of said pressure actuator to said mold plunger to effect compression of material in said mold; a fluid containing cylinder to limit the pressure transmitted to said mold plunger and to curtail the stroke thereof; reducing means connecting said fluid cylinder with said pressure transmission means, whereby pressure imparted by said transmission means to said pressure reducing means may be imparted in a reduced degree to said fluid cylinder; and automatic timing means to time the relative operation of said mold opening means and said fixed throw pressure actuator.

68. A press of the character described comprising fixed abutments, plungers movable relatively thereto, operating means therefor, movable mold feeding members between said abutments and plungers, and a single elastic fluid actuated pressure means to control a plurality of plungers and adapted to yield when a maximum plunger pressure is reached, but adapted to maintain a predetermined, uniform, maximum pressure throughout the pressing action.

69. A press comprising in combination a mold; a mold cover; operating means to change the relative position of said mold and mold cover; a mold plunger; a pressure actuator; pressure transmission means to transmit a portion of the throw of said pressure actuator to said mold plunger to effect compression of material in said mold; a fluid containing cylinder to absorb further throw of said pressure actuator and to curtail the movement of said plunger; pressure reducing means connecting said fluid cylinder with said pressure transmission means, whereby pressure imparted by said pressure transmission means to said pressure reducing means may be imparted in a reduced degree to said fluid cylinder; and automatic timing means to time the relative operation of said operating means and said fixed throw pressure actuator.

70. A press comprising in combination an abutment; a mold; a plunger reciprocable in said mold to compress material resisted by said abutment; pressure actuating means;

transmission means having the capacity to transmit a portion only of the travel of said pressure actuating means to said plunger; and elastic fluid means having the capacity to absorb movement occasioned by the remainder of said travel and to curtail the stroke of said plunger, said elastic fluid means acting as a controller to fix a predetermined maximum pressure transmitted from said pressure actuating means to said plunger.

71. A press comprising in combination an abutment; a mold; a plunger reciprocable in said mold to compress material resisted by said abutment; pressure actuating means; transmission means having the capacity to transmit a portion only of the travel of said pressure actuating means to said plunger; and elastic fluid means having the capacity to absorb movement occasioned by the remainder of said travel and to curtail the stroke of said plunger, said elastic fluid means acting as a controller to fix a predetermined maximum pressure transmitted from said pressure actuating means to said plunger, and as a pressure maintainer to maintain pressure on the contents of said mold during a portion of the return stroke of said pressure actuating means.

72. An automatic press comprising in combination a mold; means to open and close said mold; a fixed, pressure-resisting abutment; a mold plunger; an actuator for said mold plunger having a substantially unvarying range of movement; elastic fluid compensating means to limit the movement of said mold plunger when a predetermined resistance is opposed thereto; and automatically repeating timing means to time relatively the operation of said actuator and said means to open and close said mold.

73. An automatic press comprising in combination a mold; filling and ejecting means for said mold; a fixed, pressure-resisting abutment; a mold plunger; an actuator for said mold plunger having a substantially unvarying range of movement; elastic fluid compensating means to limit the compressing action of said mold plunger to a predetermined pressure; and automatically repeating timing means to time relatively the operation of said actuator and said filling and ejecting means.

74. An automatic press comprising in combination a mold; means to open and close said mold; a mold plunger; an unyielding abutment coöperating with said mold and mold plunger; an actuator having a substantially unvarying range of movement; power transmission means intermediate said actuator and said mold plunger to move the latter; elastic fluid pressure yielding means whereby a predetermined pressure is fixed by movement of said transmission means in the direction of compressing movement of said mold plunger and whereby the remainder of the movement of said actuator is absorbed without further movement of said mold plunger; and automatically repeating timing means to time relatively the operation of said actuator and said means to open and close said mold.

75. A press comprising in combination unyielding pressure receiving means; a mold; a mold cover; operating means to change the relative position of said mold and mold cover; a mold plunger; a fixed throw pressure actuator; pressure transmission means to transmit a portion of the fixed throw of said pressure actuator to said mold plunger to effect compression of material in said mold; a fluid containing cylinder to limit the pressure imparted to said mold plunger and to curtail the stroke thereof; and automatic timing means to time the relative operation of said operating means and said fixed throw pressure actuator.

76. A press comprising in combination a mold; mold opening and closing means; an unyielding abutment coöperating with said mold; a plunger in said mold; pressure actuating means; pressure transmitting means to transmit pressure to said plunger; elastically and instantaneously responsive noncumulative predetermined pressure means coöperating with said actuator to maintain a predetermined pressure on said plunger for a substantial part of the cycle of operation of said actuator when a predetermined pressure has been reached; and automatic means to time relatively the operation of said actuator and said mold opening and closing means.

77. A press comprising in combination a mold; a plunger reciprocable in said mold to compress material therein; an unyielding pressure receiving abutment to receive pressure imparted by said plunger; fixed travel pressure actuating means; mechanical pressure transmission means having the capacity to transmit a portion only of the movement occasioned by the fixed travel of said pressure actuating means to said plunger; and maximum pressure determining and maintaining means having the capacity, when a predetermined pressure has been imparted by said mold plunger to the material in said mold, to curtail the movement of said mold plunger.

In testimony whereof, I have signed my name to this specification, in the presence of two subscribing witnesses.

GEO. E. WHITNEY.

Witnesses:
 WM. L. PULTZ,
 K. A. RILEY.